May 30, 1950     S. T. GROSS     2,509,766
COLOR FILM FOR NORMALLY INVISIBLE RADIATIONS
Filed Jan. 24, 1947     2 Sheets—Sheet 1
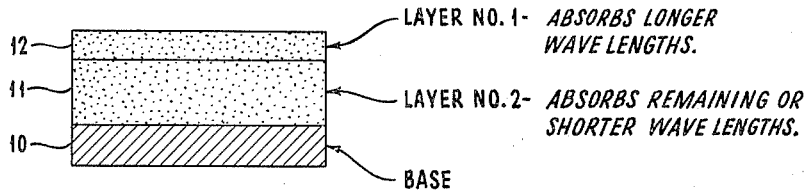
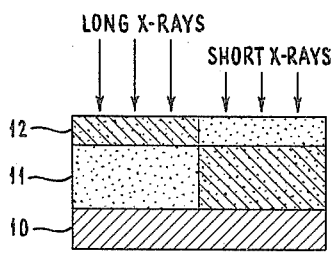
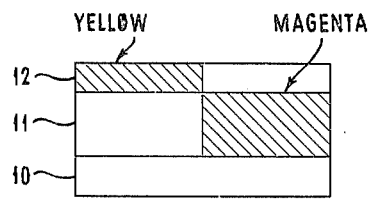
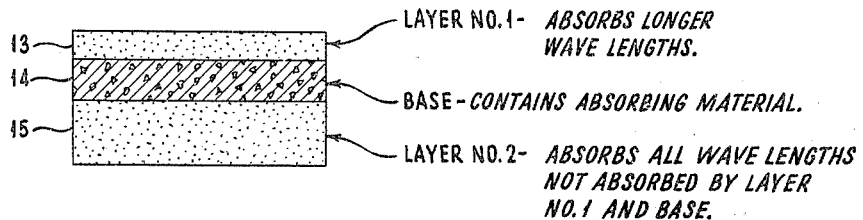
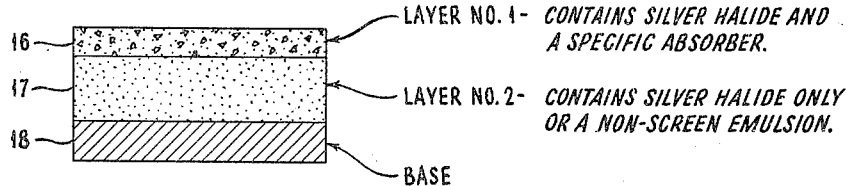
SIEGFRIED T. GROSS
INVENTOR
BY
ATTORNEYS May 30, 1950 S. T. GROSS 2,509,766
COLOR FILM FOR NORMALLY INVISIBLE RADIATIONS
Filed Jan. 24, 1947 2 Sheets-Sheet 2

FIG. 6

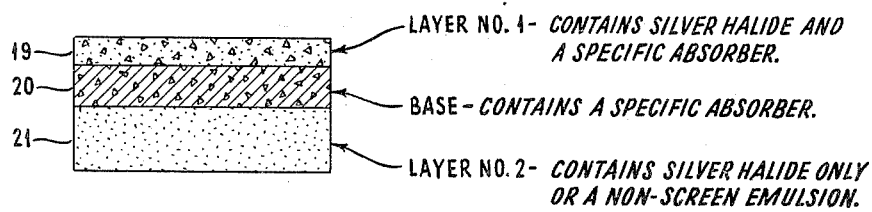

- LAYER NO. 1 — *CONTAINS SILVER HALIDE AND A SPECIFIC ABSORBER.*
- BASE — *CONTAINS A SPECIFIC ABSORBER.*
- LAYER NO. 2 — *CONTAINS SILVER HALIDE ONLY OR A NON-SCREEN EMULSION.*

FIG. 7

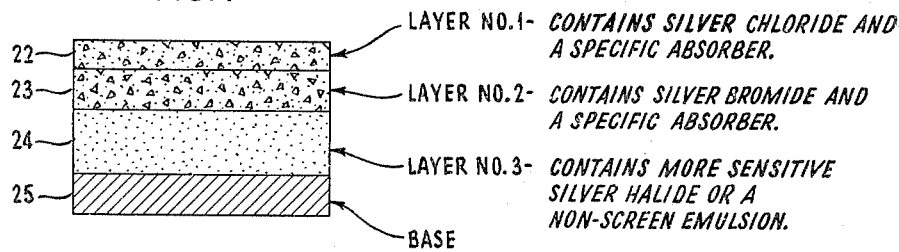

- LAYER NO. 1 — *CONTAINS SILVER CHLORIDE AND A SPECIFIC ABSORBER.*
- LAYER NO. 2 — *CONTAINS SILVER BROMIDE AND A SPECIFIC ABSORBER.*
- LAYER NO. 3 — *CONTAINS MORE SENSITIVE SILVER HALIDE OR A NON-SCREEN EMULSION.*
- BASE

FIG. 8

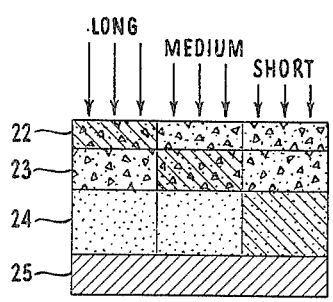

FIG. 9

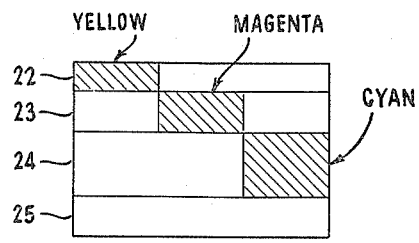

SIEGFRIED T. GROSS
INVENTOR

BY *Henry M. Roughlin*
*Rodney C. Southworth*
ATTORNEYS

Patented May 30, 1950

2,509,766

UNITED STATES PATENT OFFICE 2,509,766

COLOR FILM FOR NORMALLY INVISIBLE RADIATIONS

Siegfried T. Gross, Easton, Pa., assignor to General Aniline & Film Corporation, New York, N. Y., a corporation of Delaware Application January 24, 1947, Serial No. 724,041

2 Claims. (Cl. 250—65)

This application pertains to an invention in film for X-radiation and other normally invisible radiations, and to a method for radiographing in colors. It is especially concerned with films on which radiations of different wave lengths or having different degrees of penetration are recorded in different colors.

It is an object of the invention to produce color films for X-rays and other invisible radiations, i. e., $\beta$-rays, neutron beams, $\alpha$-rays, etc., and to devise a novel method of radiographing in contrasting colors.

According to the present practice, radiographs and other photographic recording of invisible radiations are confined to the so-called black and white images, the radiation of different wave lengths affecting the film differently in accordance with density and other physical characteristics of material penetrated by the rays before they strike the film and by the absorbing properties of the film itself. Generally speaking, it is not possible readily to detect in a black and white radiograph the wave length of the rays which cause any particular blackening thereof and it would admittedly be of advantage if that were possible. It is well known that there are certain combinations of materials which are difficult, if not impossible, to distinguish by radiography, e. g., instances where the said materials have approximately the same overall absorption of heterogeneous X-radiation.

It is practically impossible to determine the segregation of certain metals in others as zinc in copper, or cobalt in nickel. Likewise, it is difficult to determine the presence of any substance in other material wherein the overall absorption of each for the heterogeneous X-rays is substantially the same, but brought about by different wave lengths. In such cases, the resulting radiograph will show practically no contrast and it is that factor of contrast or difference in density of silver deposit over the radiograph which makes it informative and of use in diagnosis or for other purposes.

The above-mentioned disadvantage with respect to black and white radiography is overcome by the instant invention by which differences in the absorption characteristics of the materials radiographed are recorded in color. Accordingly, X-rays or other invisible radiation of differing wave lengths may be recorded in contrasting colors thereby making it no longer necessary to rely only upon density differences as in the ordinary black and white radiograph. Radiography in color makes it possible to take advantage of the differentiating effect of radiation absorption for different wave lengths.

The advantages of color radiography over black and white are evident in many phases of X-ray work, for example, in work involving the well-known Laue patterns. According to previous practice, elaborate graphic solutions and lengthy computations were the only possibility for determining the wave length of X-rays responsible for a given diffraction interference. By the use of X-ray film adapted to record in colors the different wave lengths, or wave length bands employed, the computations above mentioned are no longer necessary, it being possible to determine by the colors of the various spots on the pattern that wave length band responsible for each.

In medical radiography the degree of contrast available in black and white pictures is frequently less than desired. By using X-ray color film, the possibilities are greatly increased and the technique of radiography of this nature is somewhat simplified in that resort to special instrumentalities and unusual practice to obtain sufficient contrast in the black and white picture is no longer necessary.

Further, color differentiation would be obtained such that characteristic absorption might differentiate adjacent tissues or other structures, possibly of medical importance.

In industrial radiography, color film as hereinafter described is of decided advantage since a multiple layer film in which each of the layers is sensitive to and is adapted to record predominantly only selected wave lengths from the X-ray beam being used, shows very clearly the presence of certain elements heretofore difficult or impossible to distinguish.

According to the invention which may take varying forms, a multilayer film in which each of the layers is sensitive to and records essentially only selected wave length bands of the X-rays or other invisible radiation, is formed by coating a film base of any of the known types with two or more layers, the number of colors being dependent upon the number of layers and on the color process involved. The principle responsible for differentiation between rays of different wave lengths is that of so constituting the top layer (that nearest the source of radiation) that it absorbs, more or less completely, one wave length or one band of wave lengths of the rays. Shorter wave lengths of the radiation, those having greater penetration, largely pass through this initial layer to have their intended effect on the underlying layer designed to receive them. Each of these layers is selectively absorptive of some wave length or band of wave lengths, so that for successive layers the same effect is to be had, that is, the hardest X-rays (those of shortest wave length), finally penetrate to and essentially affect the lowermost layer only.

The effect of the X-rays of different wave lengths as originally recorded in the three layers is exemplified as a latent image in the silver halide only. Each of the layers, in addition to being sensitized to record essentially its intended wave length band only, may have therein a dye or a dye-forming substance or alternatively the film may be of a nature to have a dye image formed in the appropriate layers upon coupler or other color development. Any of the known color systems, either additive or subtractive, may be employed. Upon processing, the film is eventually reduced to a transparency in which there are color images in the appropriate layers as they are affected by the X-rays of different wave lengths.

In its simplest form, the film comprises a base and two layers. The layers may be coated at opposite sides of the base, or may be superimposed at the same side of the base. If more than two contrasting colors are desired, then more layers may be provided, but in most instances, three layers serve to differentiate a very wide band of X-rays or other invisible radiation and to give a radiograph which will show with suitable contrast the segregation of different materials in other materials, or which may be used to determine the wave length regions responsible for any particular part of the colored image.

Each of the layers is sensitive primarily only to the radiation intended to be received by it. It is desirable to so constitute the various layers that they shall be affected by practically all of the rays of a particular wave length band, and shall not be affected appreciably by other wave lengths.

The selectivity of the layers and the fidelity with which wave lengths are recorded in that layer only which is intended to record them, is greatly enhanced by the employment along with the silver halide of specific absorbing materials. Most of these absorbing materials are of such a nature that they may be incorporated in the emulsion in some suitable compound form. Generally speaking, the silver halide in the emulsion layers is exposed only by the energy from the X-radiation or other radiation which is absorbed. However, the addition of compounds containing atoms or groups which specifically absorb some given wave length of radiation will so absorb the radiation and transfer some of its energy to the silver halide thereby producing a latent image. The addition of such compounds may be regarded as the addition of a sensitizer. Absorbers in any previous layer will tend to reduce the transmitted beam by an amount equal to that of the radiation absorbed, and hence, will serve as screens for subsequent emulsion layers. Such specific absorbers also can be used in the absence of silver halide as simple screens to protect subsequent emulsion layers from undesirable radiations.

All elements of high atomic number (above titanium in the periodic table) have absorption discontinuities which make them suitable for sensitizing emulsions to, or filtering out, specific wave lengths of X-radiation.

The layers, in contrast to practice in color photography using visible light, may be widely different in their relative absorptive powers for visible light. The relative absorption may be greatly varied by varying the thickness of layers while keeping the same concentration of silver halide. Again, the layers may be of equal thickness and the concentration of a sensitizing agent, silver halide, and/or sensitized silver halide may be relatively greater in one than in others. The specific absorbers may be used without or in combination with one or both of the above-mentioned schemes for regulating the relative absorption of the respective layers.

The sensitizing or absorbing materials added to the silver halide emulsions should be in such form that they will not cause undesired effects in the final picture. This may be done by using materials, such as zinc carbonate, which can be removed by a dilute acid treatment after development, or by using them in such finely divided, colloidal form that they will be essentially transparent to visible radiation, or by using colorless materials having essentially the same refractive index as the dry gelatin, or by using materials which will be destroyed or eliminated in processing.

Some possible specific absorbers (or sensitizing agents), may be mentioned to illustrate the variety of such materials available. Halogenated gelatin can be used to introduce high concentrations of iodide or bromide atoms. Colloidal metals which will not adversely affect the photographic properties of silver halide, as for example, gold, silver, lead and the like may also be used, also compounds containing heavy atoms such as referred to above, which produce too few ions to injure the silver halide, e. g., 3,5,1-diiodotyrosine, stable organo-mercury derivatives, etc.

While the following specification will describe specific forms that the films may take, and while in that description of the invention the relative results obtainable are indicated for specific types of film and specific sensitizing-absorbing agents employed, and while the invention is to some extent described in terms employed with film adapted to be used for pictorial work and with visible light, it should be borne in mind that the actual physical phenomenon taking place when using X-rays and other invisible radiation of the type mentioned is different. In the color processes for visible light, the absorption of light of a specific color in a given emulsion layer is essentially one affecting the molecules of dye in or on the silver halide. That process is also dependent upon the transmission of other specific colors through the emulsion layer. With X-radiation, $\beta$-rays, etc., the process as herein described is also dependent upon the penetration of the radiation as a function of its wave length. The absorption or action of these rays is not molecular, however, but for the most part largely occurs deep within the individual atoms making up the system. This is termed "mass absorption" and is completely independent for all practical purposes of the chemical arrangement involving the atom considered. No emulsion layer can be completely transparent for any wave length of X-rays, $\alpha$-particle, or $\beta$-ray, and while in the specification reference is made to absorption of rays of certain wave lengths in some layer, it must be borne in mind that the terms employed are relative and that no film is likely to be absolutely perfect in its differentiation or selectivity between rays of different wave lengths, but for all practical purposes, the layers may be so constituted that they are sufficiently selective to give a final color image of substantially that color to be expected or for which the layer has been designed.

The invention will be described by reference to to the accompanying figures of drawing wherein:

Fig. 1 is a view showing to a greatly enlarged scale, a section of film according to one form the invention may take.

Fig. 2 is a similar view showing the same film having a latent image effected by X-rays of different wavelengths.

Fig. 3 is a similar view showing the resultant dye image.

Fig. 4 is a view similar to Fig. 1, but showing another form of the invention.

Fig. 5 shows still another form which the invention may take.

Fig. 6 shows a modification of the film of Fig. 4.

Fig. 7 shows another form of film according to the invention.

Fig. 8 shows the film of Fig. 7 after the same has been subjected to X-rays of different wavelengths.

Fig. 9 shows the resultant dye image of this film after processing.

Referring to Fig. 1, a section of film has been illustrated in which a base 10 has coated thereon two emulsion layers 11 and 12. In this film which is an extremely simple form of the invention, reliance is placed on the absorption of the X-rays or other invisible rays by the radiation sensitive material which is the basic absorber of the layer and which may be a silver halide, either silver bromide or silver chloride. Here the layers are not of the same thickness and the silver halide within the layers is of the same concentration or density per unit of thickness. The layer 12 is of such thickness and the sensitive material is of such type as to absorb all or practically all of one wave length of the radiation for which the film is designed. In this instance, to simplify the description, it is to be assumed that only two wave lengths of radiation are to be employed and, of course, the longer wave length with the higher absorption coefficient will be essentially absorbed in and will affect only the top layer. The layer 11 is of such thickness for the concentration of silver halide employed that it will absorb virtually all of the other wave length rays. As before stated, it would be extremely impractical to devise a film comprising a plurality of layers in which all of one wave length of radiation would be completely absorbed in any one layer and only one and, therefore, there is some overlapping effect and the longer wave length radiation will to some extent have an effect on the second layer and vice versa. So long as the selectivity of the layers to their intended wave length of radiation is kept within reasonable limitations, the resulting dye images formed may be employed as satisfactorily as would be the case if theoretically perfect response were forthcoming. In fact, the visual opacity to ordinary light for each layer may be many times greater than that employed in ordinary photography.

The layers 11 and 12 have incorporated therein some agent adapted to assist in later production of a colored dye image upon processing the exposed film. While any of the known color systems may be employed, the invention will be described by reference to that type of color system known as a subtractive system and in which a colorless dye component is incorporated in the emulsion and is adapted to be processed later to develop reaction products giving a colored dye image at those areas affected by the radiation to which the emulsion in that particular layer is sensitive. To simplify the illustration, the process may be assumed to be one resulting in a negative image, that is, one where the actual area affected by the radiation and the layer to which said effect is confined would eventually be developed in color.

While the color eventually to be obtained may be any contrasting color desired, the following disclosure will make reference to the usual color scheme employed for pictorial photography. The top layer may have incorporated therein components which upon processing will eventually give a yellow dye image while the second layer may eventually contain a magenta dye at those points affected by the intended wave lengths of radiation. Preferably, the resulting colors should be such as to have considerable contrast since then the radiograph may be more easily interpreted. There is nothing in the nature of a pictorial representation of a scene and, therefore, color balance is not essential, and, in fact, contrast between the images in the different layers is maintained at something far greater than that permissible in ordinary pictorial representations.

In Fig. 2, the film of Fig. 1 is shown after it has been subjected to long and short wave lengths of X-rays. The sectioned portions of the emulsion layers indicate that a latent image has been formed by the absorbed X-rays. There actually would be some effect in the unsectioned portions of the emulsion layers, but as before explained, that overlapping or effect of the radiation in undesired layers is unavoidable but may be maintained at a minimum which causes no particular difficulty although the purity of color in the dye image in the film after final processing will not be that which theoretically would be most desirable. In other forms of the invention later to be described, methods and means for reducing the amount of this so-called overlapping effect will be discribed.

In Fig. 3, the film is to be understood as being transparent and, of course, the areas in which there are no dye images are practically colorless. The dye image may be of any satisfactory density depending upon the purpose for which the film is used and upon other considerations.

One of the simplest and most effective color processes is the subtractive color system adapted to give a negative image and which depends for production of color in the various layers upon certain colorless dye-forming substances which are converted into dye images confined to their respective layers upon development and further processing. The formation of such dye images is well known to those skilled in the art and need not be described in detail at this point. It is to be understood that the contrast of the dye images in the various layers may be varied, but for all practical purposes, is preferably greater than any contrast desired or permissible for ordinary photography in color.

Other color systems may be employed, and, of course, a positive or reversal process may be used in which event the processing of the film is changed accordingly. If a subtractive system in which the dye image is introduced into the appropriate layers during development is used, then the development must be with coupler developers and the other processing adapted to that system of color production.

In Fig. 3, the same section of the film has been illustrated as it would appear after completion of processing. Of course, such a film would be viewed by transmitted light and the base 10 and all layers should be substantially colorless with the exception of the dye images such as the yellow and magenta images appearing in their respective layers.

For the purpose of describing the film of Fig. 1, more specifically and for illustrating the distinctions between this film and those for pictorial work, certain values or specifications will be determined for said film when it is subjected to X-rays of arbitrarily specified wave lengths. In determining the absorption of the X-rays in each of the layers, and for determining the relative ratio for the thicknesses of layers #1 and #2 under specific conditions, the following formulae are employed:

$$I = I_0 e^{-at}$$

$$E \text{ abs } (\lambda)_1 = I_0(\lambda)[1 - e^{-a_1 t_1}]$$

$$E \text{ abs } (\lambda)_2 = I_0(\lambda) e^{-a_1 t_1}[1 - e^{-a_2 t_2}]$$

$$E \text{ abs } (\lambda)_3 = I_0(\lambda) e^{(-a_1 t_1 - a_2 t_2)}[1 - e^{-a_3 t_3}]$$

Wherein:

E abs = energy absorbed.
$e$ = base of natural logs.
$a$ = absorption coefficient derived from the sum of mass absorption coefficients, etc. for a given layer.
$t$ = thickness of layer times the concentration of matter involved in a given layer.
I = transmitted intensity.
$I_0$ = initial intensity.
$\lambda$ = wave length of radiation.

Subscripts 1, 2, 3, etc. refer to layers #1, #2, #3, etc.

For the film of Fig. 1, let it be assumed that the thickness of the first layer is to be such that 90% of the longer wave length radiation is absorbed by it. Also assume that 80% of the shorter wave length radiation is to be absorbed by layer #2. The absorber employed is silver bromide and the two wave lengths of X-rays which strike the emulsion are: $\lambda = 0.90$ A. U. (Angstrom Units, $10^{-8}$ cm.) for layer #1; and $\lambda = 0.20$ A. U. for layer #2. The mass absorption coefficients (absorption coefficient divided by the density) for silver and bromine, and their products with the atomic weight of silver and bromine are indicated below:

| Wave length, A. U. | 0.90 | 0.20 |
|---|---|---|
| Mass absorption coefficients: | | |
| silver | 54.2 | 5.48 |
| bromine | 150 | 1.78 |
| $\mu$ (silver) (108) | 5,832 | 594.0 |
| $\mu$ (bromine) (80) | 12,000 | 142.4 |
| Sum | 17,832 | 736.4 |

The sum of the products would represent a weighted term for the absorption of the compound silver bromide, and since the ratios of these values only are of importance, it is convenient to take the two values as 17.832 and 0.7364. (The mass absorption coefficients may be found in chemical handbooks.)

Now solving for the relative thickness of layer #1 which is to absorb 90% of the longer wave length rays:

$$0.9 = (1 - e^{-17.832 t_1})$$

$$0.1 = e^{-17.832 t_1}$$

$$t_1 = 0.1287$$

NOTE.—This is the relative thickness or a value which may indicate the thickness and concentration when the incident X-ray intensity is unity.

Next solving for the energy of the shorter wave length rays which is absorbed in layer #1:

$$E = (1 - e^{-0.1287 \times 0.7364})$$

$$E = (1 - 0.91) = 0.09$$

That is, 91% of the energy of the 0.20 A. U. radiation reaches layer #2, and according to the specifications above set forth, 80% of the total energy is to be absorbed in that layer.

Solving for the relative thickness of layer #2:

$$0.8 = 0.91 (1 - e^{-0.736 t_2})$$

$$t_2 = 2.76$$

Since 90% only of the longer wave length rays are absorbed in layer #1, 10% reach layer #2 and are absorbed essentially completely in that layer.

The relative thicknesses may be used to obtain the ratio of thicknesses for the layers. So doing, layer #2 should be 21.4 times the thickness of layer #1.

The use of a more sensitive emulsion for this second layer (i. e., non-screen emulsion) would reduce this ratio.

By tabulating the relative amounts of the energy absorbed in the layers for their respective wave lengths, an indication of the relative purity of color or selectivity of the layers for their intended wave length bands of the X-ray spectrum is obtained. Thus for this film:

| | $\lambda = 0.90$ A.U. | $\lambda = 0.20$ A. U. |
|---|---|---|
| Layer #1 | $E$ abs = 0.90 | $E$ abs = 0.09 |
| Layer #2 | $E$ abs = 0.10 | $E$ abs = 0.80 |

As a result the film when viewed by transmitted light, shows at the areas affected by longer wave length radiation a color which is subtractively obtained through layers 90% yellow and 10% magenta or a yellow which approaches orange, and for other areas a color resulting from the 10% yellow and 80% magenta or a magenta slightly off shade by addition of more red and some green, provided yellow and magenta are chosen as colors.

Now referring to Fig. 4, a modification will be described in which the base of the film serves as a screen. By incorporating an absorbing agent in the base and by coating a layer of the emulsion at the back of the base so that rays must pass through the base to reach that layer, it is possible to obtain greater purity of color in the resultant image, or to render the layers more selective.

Here layer 13 is the top layer and contains only a silver halide. The base 14 has dispersed therein an absorbing agent, preferably one adapted to absorb the longer wave lengths or at least those rays not intended to reach the second or underlying layers. A suitable copper compound may be used and from the tables the mass absorption coefficients for copper at the wave lengths 0.90 A. U. and 0.20 A. U. are 98.0 and 1.41, respectively.

Assume that, as before the layer #1 absorbs 90% of the wave length 0.90 A. U. rays so that 10% are transmitted, and that layer #1 absorbs 10% of the 0.20 A. U. rays and the remaining 90% are transmitted. Also make the thickness of the base and concentration of the copper compound such that the absorption values for it will be .98 unit for the 0.90 A. U. rays and .014 unit for the 0.20 A. U. rays.

Calculations similar to those for the first described film may be made. The effect of the screening base and the positioning of that base between the layers is to absorb virtually all the 10% of 0.90 A. U. rays transmitted. Of course, some of the energy from the shorter or harder wave lengths is absorbed by the screen, but an absorber is chosen which will have as little effect on the 0.20 A. U. rays as is practicable.

The calculations themselves need not be given here, but the results obtained are as follows:

Ratio of thickness for layer #1 to layer #2 = about 1 to 23.55.

|  | $\lambda = 0.90$ A. U. | $\lambda = 0.20$ A. U. |
| --- | --- | --- |
| Layer #1 | $E$ abs=0.90 | $E$ abs=0.09 |
| Layer #2 | $E$ abs=0.04 | $E$ abs=0.80 |

Thus practically none of the longer wave length rays reach the second layer. By the use of a non-screen emulsion for the bottom layer, or of a removable intensifying screen (e. g., lead or calcium tungstate) below the bottom layer, the thickness of this layer can be reduced.

Another modification is shown in Fig. 5. Again, the layers of emulsion are coated at the same side of a base which is any acetate or other base suitable for the purpose. The layer 16 is, in addition to its function as an absorber and record for longer wave length rays, a screen for the second layer 17. Of course, the base 18 is generally transparent, but in instances as will be described more thoroughly, may serve to intensify the image in the second layer. In layer #1, in addition to the usual silver bromide, the same amount and concentration of a copper compound is added as was used in the base 14, Fig. 4. It is to be understood that this copper compound is chosen to simplify computations, although any organo-copper compound which will not interfere with silver halide may actually be used.

The results from computing energy absorbed and relative thickness of layers give a ratio of 1 to 62.6 for the layers #1 and #2. For the effect upon each layer:

|  | $\lambda = 0.90$ A. U. | $\lambda = 0.20$ A. U. |
| --- | --- | --- |
| Layer #1 | $E$ abs=0.90 | $E$ abs=0.07 |
| Layer #2 | $E$ abs=0.10 | $E$ abs=0.90 |

Thus, with this film the ultimate response to the longer wave lengths is substantially unaffected, but the presence of the specific absorber in the layer 16 makes it possible to so design the layer that it shall stop less of the short X-rays. This gives better response or selectivity for these short X-rays without sacrificing reasonable efficiency for the long X-rays.

In Fig. 6, a film similar to that of Fig. 4 has a specific absorber in both the first layer and in the base which is intermediate the layers. Layer 19 is the same as layer 16 in Fig. 5. The base is the same as that base 14 of Fig. 4. The result obtained here shows that with the same thicknesses for the layers and the same concentration of silver bromide and specific absorbers, the advantages of greater selectivity and purity of color prevail for both long and short X-rays.

The ratio of thickness of layer #1 to layer #2 in this case will be 1 to 72.4.

|  | $\lambda = 0.90$ A. U. | $\lambda = 0.20$ A. U. |
| --- | --- | --- |
| Layer #1 | $E$ abs=0.90 | $E$ abs=0.07 |
| Layer #2 | $E$ abs=0.04 | $E$ abs=0.90 |

Briefly, the absorbing compound (copper) in the first layer permits that layer to be so thin in proportion to the second layer that very little of the 0.20 A. U. energy is stopped there, while the screen base 20 prevents 0.90 A. U. X-rays reaching the layer 21. It is to be noted that copper or some other absorber which is very opaque to longer X-rays, but relatively transparent to short X-rays is desired.

In Figs. 7, 8, and 9, a three-layer film is shown, all layers 22, 23, and 24 being coated at the same side of a base 25. The top layer 22 is a silver chloride emulsion; layer 23 is sensitized as were the layers previously described; layer 24 is preferably a non-screen emulsion. For the layer 23 an absorber such as some colloidal or otherwise dispersed copper compound, as indicated previously, may be used. Tin compounds, perhaps organo-metallic, such as dimethyl tin, could be dispersed in the emulsion to much the same purpose.

Here the film can record in distinct, contrasting colors three wave lengths or wave length bands of X-rays. Assume that longer X-rays of $\lambda = 1.54$ A. U. are employed in addition to the lengths already considered.

Corresponding figures show a thickness ratio for the layers of: Layer #1=1; Layer #2=1.2; and Layer #3=52.7.

The following values give an indication of the effect in the finished film, Fig. 9, and of the colors to be expected.

|  | $\lambda = 1.54$ A. U. | $\lambda = 0.90$ A. U. | $\lambda = 0.20$ A. U. |
| --- | --- | --- | --- |
| Layer #1 | $E$ abs=0.80 | $E$ abs=0.33 | $E$ abs=0.04 |
| Layer #2 | $E$ abs=0.17 | $E$ abs=0.60 | $E$ abs=0.07 |
| Layer #3 | $E$ abs=0.03 | $E$ abs=0.07 | $E$ abs=0.80 |

Here the greatest purity of color comes in layer #3 and for the shortest X-rays, but it is to be understood that by choice of concentration, layer thickness, absorbers and sensitizers for the particular wave lengths of radiation to be recorded, the values and results can be controlled over a wide range.

In any of the films in which all emulsion layers lie at one side of the base, the base may be employed as an intensifying screen. For that purpose, the base may contain a dispersion of some colloidal or organic lead compound in suitable concentration that will leave the base transparent after developing.

Instead of, or in addition to, the specific absorbers in the layers, so-called filter layers may be interposed between desired emulsion layers. The filter layers may have dispersed therein any of the absorbing compounds mentioned, or others of similar effect.

In some cases it may be desirable to separate each of the emulsion layers by a plain gelatine layer or a gelatine layer which may contain absorbing agents to further control the color properties of the film.

The disclosure of specific films herein given by way of illustration has been based on use of absorber-sensitizers of uniform concentration in the several layers. However, it should be understood that when it becomes impractical to coat a base with layers of widely differing thicknesses, the concentration of the sensitive agent or absorbers, may be varied to use layers of the same thickness or of more nearly the same thickness. The use of "non-screen" emulsion which absorbs strongly all X-radiation facilitates the use of thin emulsion layers. What is important is the total absorption of the X-rays or other normally invisible rays in the several layers. In contrast to films for photography by visible or near visible light there is no attempt at color balance between layers or to obtain a record that will have any pictorial significance. Rather, the relative response in the layers is designed to give contrasting images for the different wave lengths recorded.

The terms "absorbing" and "absorbing-sensitizing" agents have been employed through the specification and claims. The absorbing agent is to be understood as a material which characteristically absorbs radiation of certain wave lengths. Incidental to such absorption, secondary electrons of important energy content and highly suitable for photographic exposure are released. These secondary electrons are readily absorbed and produce further exposure in the same layer. For this reason, an absorbing agent if placed in the same emulsion layer with silver halide will not only serve to absorb radiation but also to increase the total exposure in that layer. Absorbing agents in the absence of silver halide will serve merely as screens to reduce the transmission of certain wave length bands of radiation.

In addition to the sensitizers and/or absorbers in the layers there are dye or color components which upon development form the dye image, or if other processes are employed, then the color may be added to the layers by coupler development at which time the layers are dyed. The latter may be facilitated by certain agents incorporated in the layers of film or may be a selective toning process confined to the individual and intended layers. In the event a base is coated at opposite sides, the latter method is practicable. Thus, the film may be produced having color forming elements or elements for assisting in the formation of color in it, or may have no such element incorporated therein.

It will readily be apparent that a color X-ray film, such as is herein described and claimed, makes it very easy to determine which wave lengths of the X-rays have caused a particular effect on the film. For example, when examining the structure of certain crystals by X-rays, the diffraction of the various wave lengths, or those parts of the diffraction pattern resulting from rays of some particular wave length, may readily be determined. In the ordinary black and white method, it is necessary to resort to a complicated graphic or mathematical computation in order to determine these factors. When studying X-ray spectra, the possibility of recording certain definite wave lengths in particular colors or shades thereof greatly facilitates such work and also makes possible the determination of information not heretofore possible.

While several forms of the invention have been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. A multi-layer X-ray film comprising a plurality of superimposed silver halide emulsion layers, one layer being selectively sensitized to absorb X-rays of a predetermined wave length and to transmit the remaining X-rays and the other layer being selectively sensitized to absorb X-ray wave lengths transmitted by the first layer, each layer having a color-forming component capable upon development of yielding differently colored subtractive dyestuff images.

2. A process of preparing subtractive dye images in a multi-layer X-ray film comprising a plurality of superimposed silver halide emulsion layers, one layer being selectively sensitized to absorb X-rays of a predetermined wave length and to transmit the remaining X-rays and the other layer being selectively sensitized to absorb X-ray wave lengths transmitted by the first layer, which comprises simultaneously exposing said multi-color X-ray film to X-rays, and color-developing the exposed film to form subtractive dye images in the layers.

SIEGFRIED T. GROSS.

REFERENCES CITED

The following references are of record in the file of this patent:

UNITED STATES PATENTS

| Number | Name | Date |
| --- | --- | --- |
| 2,172,262 | Schinzel | Sept. 5, 1939 |
| 2,251,965 | Verkinderen | Aug. 12, 1941 |

FOREIGN PATENTS

| Number | Country | Date |
| --- | --- | --- |
| 276,678 | Great Britain | Nov. 3, 1927 |